(12) United States Patent
Rau et al.

(10) Patent No.: US 11,041,502 B2
(45) Date of Patent: Jun. 22, 2021

(54) DOUBLE INLET BACKWARD CURVED BLOWER

(71) Applicant: Carrier Corporation, Palm Beach Gardens, FL (US)

(72) Inventors: Mark Patrick Rau, Fairport, NY (US); Mehmet N. Sarimurat, Fayetteville, NY (US); Ryan K. Dygert, Cicero, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 153 days.

(21) Appl. No.: 16/246,939

(22) Filed: Jan. 14, 2019

(65) Prior Publication Data
US 2019/0234418 A1 Aug. 1, 2019

Related U.S. Application Data

(60) Provisional application No. 62/623,900, filed on Jan. 30, 2018.

(51) Int. Cl.
*F04D 29/28* (2006.01)
*F04D 17/16* (2006.01)
(Continued)

(52) U.S. Cl.
CPC ......... *F04D 29/281* (2013.01); *F04D 17/162* (2013.01); *F04D 29/023* (2013.01); *F04D 29/282* (2013.01); *F04D 29/624* (2013.01); *F04D 29/626* (2013.01); *F23L 5/02* (2013.01); *F05D 2230/232* (2013.01); *F05D 2300/43* (2013.01)

(58) Field of Classification Search
None
See application file for complete search history.

(56) References Cited

U.S. PATENT DOCUMENTS

| 5,558,499 A | 9/1996 | Kobayashi |
| 7,108,482 B2 | 9/2006 | Chapman |
(Continued)

FOREIGN PATENT DOCUMENTS

| CN | 1862029 A | 11/2006 |
| CN | 101846087 A | 9/2010 |
(Continued)

OTHER PUBLICATIONS

PCT ISR Written Opinion; International Application No. PCT/US2017/057182; International Filing Date: Oct. 18, 2017; dated Jan. 26, 2018; pp. 1-6.
(Continued)

*Primary Examiner* — Juan G Flores
(74) *Attorney, Agent, or Firm* — Cantor Colburn LLP

(57) ABSTRACT

A method of assembling a fan wheel includes forming a first wheel portion including a first plurality of impeller blades and a first connector, forming a second wheel portion including a second plurality of impeller blades and a second connector, affixing an end of each of the first plurality of impeller blades to a first surface of a support ring such that the first connector is affixed to the second connector, and affixing an end of each of the second plurality of impeller blades to a second surface of a support ring.

7 Claims, 13 Drawing Sheets

(51) Int. Cl.
*F04D 29/62* (2006.01)
*F04D 29/02* (2006.01)
*F23L 5/02* (2006.01)

(56) References Cited

U.S. PATENT DOCUMENTS

| | | | |
|---|---|---|---|
| 7,563,074 | B2 | 7/2009 | Xu |
| 7,762,778 | B2 | 7/2010 | Purvines |
| 8,100,637 | B2 | 1/2012 | Sinzaki |
| 8,133,009 | B2 * | 3/2012 | Salvesen ............... F04D 29/023 415/118 |
| 8,177,484 | B2 | 5/2012 | Haraguchi et al. |
| 8,337,157 | B2 | 12/2012 | Kilian et al. |
| 9,109,605 | B2 * | 8/2015 | Chou .................... F04D 29/282 |
| 9,109,610 | B2 | 8/2015 | Streng et al. |
| 9,140,270 | B2 | 9/2015 | Hong |
| 9,447,790 | B2 | 9/2016 | Nakai et al. |
| 9,689,264 | B2 | 6/2017 | Cocks et al. |
| 9,933,185 | B2 * | 4/2018 | Kameyama ........... F04D 29/023 |
| 10,704,554 | B2 * | 7/2020 | Nakai .................... F04D 29/283 |
| 2002/0182079 | A1 | 12/2002 | Gerken et al. |
| 2008/0279682 | A1 * | 11/2008 | Wydra ................ F04D 29/2222 415/206 |
| 2010/0158689 | A1 | 6/2010 | Nishino |
| 2011/0243720 | A1 | 10/2011 | Post |
| 2012/0093650 | A1 | 4/2012 | Martin et al. |
| 2012/0156024 | A1 | 6/2012 | Horng et al. |
| 2013/0089425 | A1 | 4/2013 | Wu |
| 2013/0170945 | A1 | 7/2013 | Gatley, Jr. et al. |
| 2015/0071800 | A1 | 3/2015 | Lee et al. |
| 2016/0115967 | A1 | 4/2016 | Kurihara et al. |
| 2017/0107997 | A1 | 4/2017 | Yamamoto et al. |
| 2020/0072237 | A1 | 3/2020 | Anderson et al. |

FOREIGN PATENT DOCUMENTS

| | | | | |
|---|---|---|---|---|
| CN | 202851448 | U | 4/2013 | |
| CN | 103696985 | A | 4/2014 | |
| CN | 103807209 | A | 5/2014 | |
| CN | 203685679 | U | 7/2014 | |
| CN | 203879799 | U | 10/2014 | |
| CN | 203879801 | U | 10/2014 | |
| CN | 104747495 | A | 7/2015 | |
| CN | 104806567 | A | 7/2015 | |
| CN | 105090107 | A | 11/2015 | |
| CN | 105179281 | A | 12/2015 | |
| CN | 204961385 | U | 1/2016 | |
| DE | 3247453 | C1 | 12/1983 | |
| EP | 0348846 | A2 | 1/1990 | |
| EP | 1933040 | A1 | 6/2008 | |
| JP | S5117005 | A | 2/1976 | |
| JP | S55114897 | A * | 9/1980 | |
| JP | S55114897 | A | 9/1980 | |
| JP | 4507553 | B2 * | 7/2010 | ........... F04D 29/023 |
| WO | 2013092289 | A1 | 6/2013 | |
| WO | 2014109108 | A1 | 7/2014 | |
| WO | 2015064514 | A1 | 5/2015 | |
| WO | 2017073593 | A1 | 5/2017 | |

OTHER PUBLICATIONS

PCT Notification of Transmittal of International Search Report; International Application No. PCT/US2017/057182; International Filing Date: Oct. 18, 2017; dated Jan. 26, 2018; pp. 1-5.

Branson, "Contoured Infrared Technology: Non Contact Plastic Welding for Particulate-free and Aesthetically Clean Joints," Emerson Industrial Automation; 2013; pp. 1-6.

Extended European Search Report; International Application No. 19154328.9-1007; International Filing Date: Jan. 29, 2019; dated Jun. 26, 2019; 9 pages.

\* cited by examiner

DOUBLE INLET BACKWARD CURVED BLOWER

CROSS-REFERENCE TO RELATED APPLICATIONS

This application claims the benefit of U.S. Provisional Application Ser. No. 62/623,900, filed Jan. 30, 2018, which is incorporated herein by reference in its entirety.

BACKGROUND

The disclosure relates generally to heating and cooling systems and, more particularly, to a fan wheel of a blower assembly configured for use in such heating and cooling systems.

Heating, ventilation and air conditioning and refrigeration (HVAC & R) systems typically use a blower driven by a blower motor to supply air through ducts. HVAC & R systems are typically designed to provide an amount of airflow expressed as cubic feet per minute (CFM) (cubic meters per second in SI units). To meet new furnace efficiency requirements (FER) changes to existing blower wheels and motors for furnace applications are required. Existing blower wheels are heavy metallic assemblies that are welded or fastened together. The design of traditional metallic blower wheel designs is typically limited by the manufacturing process used to produce such blower wheels. As a result, performance potential is limited and the drive motor size, and the corresponding energy requirements, is increased.

BRIEF DESCRIPTION

According to an embodiment, a method of assembling a fan wheel includes forming a first wheel portion including a first plurality of impeller blades and a first connector, forming a second wheel portion including a second plurality of impeller blades and a second connector, affixing an end of each of the first plurality of impeller blades to a first surface of a support ring such that the first connector is affixed to the second connector, and affixing an end of each of the second plurality of impeller blades to a second surface of a support ring.

In addition to one or more of the features described above, or as an alternative, in further embodiments the first wheel portion is formed separately from the second wheel portion.

In addition to one or more of the features described above, or as an alternative, in further embodiments affixing the end of the first plurality of impeller blades to the first surface of a support ring includes positioning the ends of the first plurality of impeller blades at a plurality of blade receiving areas of the first surface of the support ring.

In addition to one or more of the features described above, or as an alternative, in further embodiments positioning the ends of the first plurality of impeller blades at a plurality of blade receiving areas of the first surface includes positioning the ends of the first plurality of impeller blades within a plurality of pockets formed in the first surface of the support ring.

In addition to one or more of the features described above, or as an alternative, in further embodiments each of the pockets further comprises a first sidewall, a second sidewall, and an opening defined between the first sidewall and the second sidewall, and positioning the ends of the first plurality of impeller blades within the plurality of pockets further comprises installing the ends of the first plurality of impeller blades within the openings of the plurality of pockets.

In addition to one or more of the features described above, or as an alternative, in further embodiments each of the plurality of blade receiving areas includes a land and at least one groove adjacent the land, and positioning the ends of the first plurality of impeller blades at a plurality of blade receiving areas of the first surface includes further comprises positioning the ends of the first plurality of impeller blades in direct contact with the plurality of lands.

In addition to one or more of the features described above, or as an alternative, in further embodiments affixing an end of each of the first plurality of impeller blades to a first surface of a support ring further comprises welding the ends to the plurality of blade receiving areas of the first surface of the support ring.

In addition to one or more of the features described above, or as an alternative, in further embodiments welding the ends to the plurality of blade receiving areas of the first surface of the support ring further comprises welding the ends of the first plurality of impeller blades to the plurality of lands.

In addition to one or more of the features described above, or as an alternative, in further embodiments welding the ends of the first plurality of impeller blades to the plurality of lands displaces a portion of material of the lands into the at least one groove.

In addition to one or more of the features described above, or as an alternative, in further embodiments coupling the first connector and the second connector includes welding the first connector to the second connector.

In addition to one or more of the features described above, or as an alternative, in further embodiments at least one of the first wheel portion and the second wheel portion is formed via a plastic molding process.

According to another embodiment, a fan wheel for use in a blower assembly includes a first wheel portion including a first plurality of impeller blades and a second wheel portion including a second plurality of impeller blades. A support disk is positioned near a center of the fan wheel, between the first wheel portion and the second wheel portion. The support disk couples the first wheel portion to the second wheel portion and at least one of the first wheel portion, the second wheel portion, and the support disk is formed from a plastic material.

In addition to one or more of the features described above, or as an alternative, in further embodiments the first wheel portion, the second wheel portion, and the support ring are formed separately.

In addition to one or more of the features described above, or as an alternative, in further embodiments the fan wheel includes a first plurality of blade receiving areas formed in a first surface and the fan wheel includes a second plurality of blade receiving areas formed in a second, opposite surface.

In addition to one or more of the features described above, or as an alternative, in further embodiments the first plurality of impeller blades are welded to the first plurality of blade receiving areas.

In addition to one or more of the features described above, or as an alternative, in further embodiments the first plurality of impeller blades are mechanically coupled to the first plurality of blade receiving areas.

In addition to one or more of the features described above, or as an alternative, in further embodiments the first plurality of blade receiving areas include a plurality of pockets including openings complementary to the first plurality of impeller blades.

In addition to one or more of the features described above, or as an alternative, in further embodiments the first wheel portion further comprises a first connector and the second wheel portion further comprises a second connector and the first connector is coupled to the second connector.

In addition to one or more of the features described above, or as an alternative, in further embodiments the first connector is welded to the second connector.

These and other advantages and features will become more apparent from the following description taken in conjunction with the drawings.

BRIEF DESCRIPTION OF THE DRAWING

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 11A is a detailed perspective view of the nesting fixture of FIG. 11 according to an embodiment;

DETAILED DESCRIPTION

Figure 1:
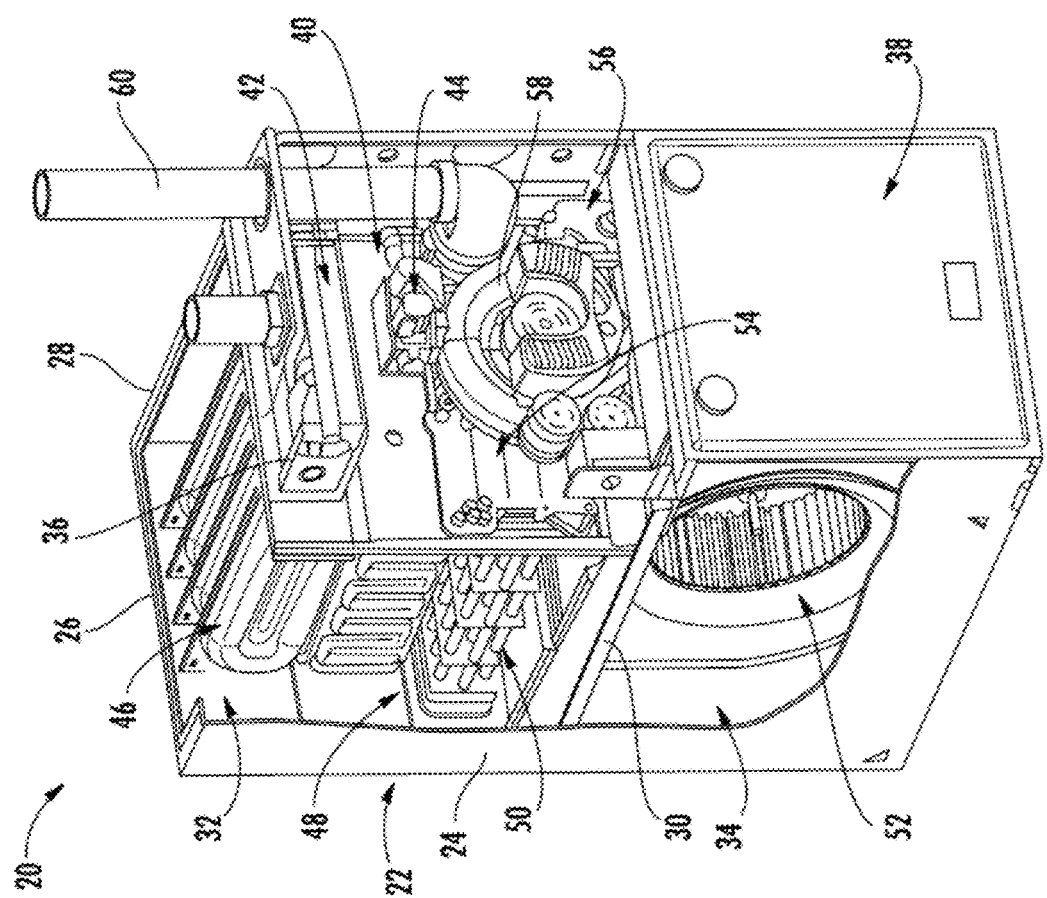
FIG. 1 is a perspective view of an example of a gas furnace system.

With reference to FIG. 1, an example of a gas furnace system is illustrated generally at 20. The gas furnace system 20 includes a housing 22 having a plurality of exterior walls 24, 26, 28 and an interior dividing wall 30 that forms a heat exchange portion 32 and a blower portion 34. Heat exchange portion 32 includes a component support wall 36 which, as will be discussed more fully below, provides structure for mounting various components of the gas furnace system 20. Housing 22 is also shown to include an access panel 38 that provides access to the blower portion 34 and another access panel (not shown) that provides access to heat exchange portion 32.

The gas furnace system 20 additionally includes a burner assembly 40 mounted to component support wall 36. Burner assembly 40 includes a burner box 42 and a gas valve 44. Burner assembly 40 combusts a fuel, in the form of gas, to generate heat used to condition a comfort zone such as living spaces, work spaces and the like. As will be discussed more fully below, products of combustion or exhaust gases generated by the burning of the fuel are expelled to ambient. In the embodiment shown, burner assembly 40 is operatively connected to a primary heat exchanger 46 arranged within heat exchange portion 32. Primary heat exchanger 46 is operatively coupled to a condensing heat exchanger 48. Condensing heat exchanger 48 includes a plurality of heat exchange members 50. With this arrangement, a blower assembly 52 arranged within the blower portion 34 draws in air from a space to be heated. The air is guided over primary heat exchanger 46 and heat exchange members 50 of condensing heat exchanger 48 such that the air is heated before being re-introduced into the space.

During operation of the gas furnace system 20, moisture from the products of combustion condenses condensing heat exchanger 48. This moisture collected and passed on to an external drain (not shown). The moisture is guided to a condensate collector box 54. Condensate collector box 54 is secured to component support wall 36. The moisture is collected in condensate collector box 54 and passed to a condensate trap 56 and on to the external drain. Gas furnace system 20 further includes an inducer fan assembly 58 mounted to condensate collector box 54. Inducer fan assembly 58 creates an air flow that establishes a draft which draws the products of combustion from burner box 42 through primary heat exchanger 46 and heat exchange members 50 of the condensing heat exchanger 48. More specifically, inducer fan assembly 58 produces a pressure rise and flow rate to achieve a desired combustion performance while overcoming flow losses within gas furnace system 20. The products of combustion are then exhausted through a flue vent 60.

Figure 2:
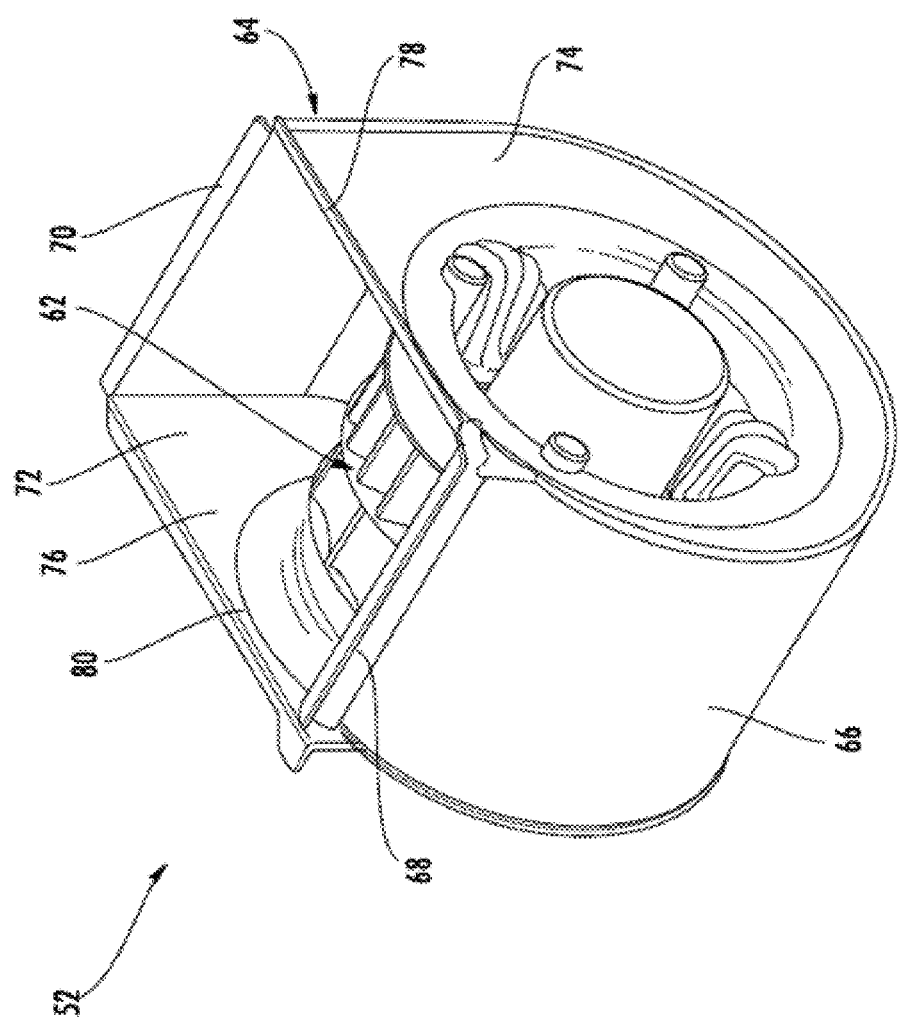
FIG. 2 is a perspective view of a blower assembly of the gas furnace system according to an embodiment.
Figure 3:
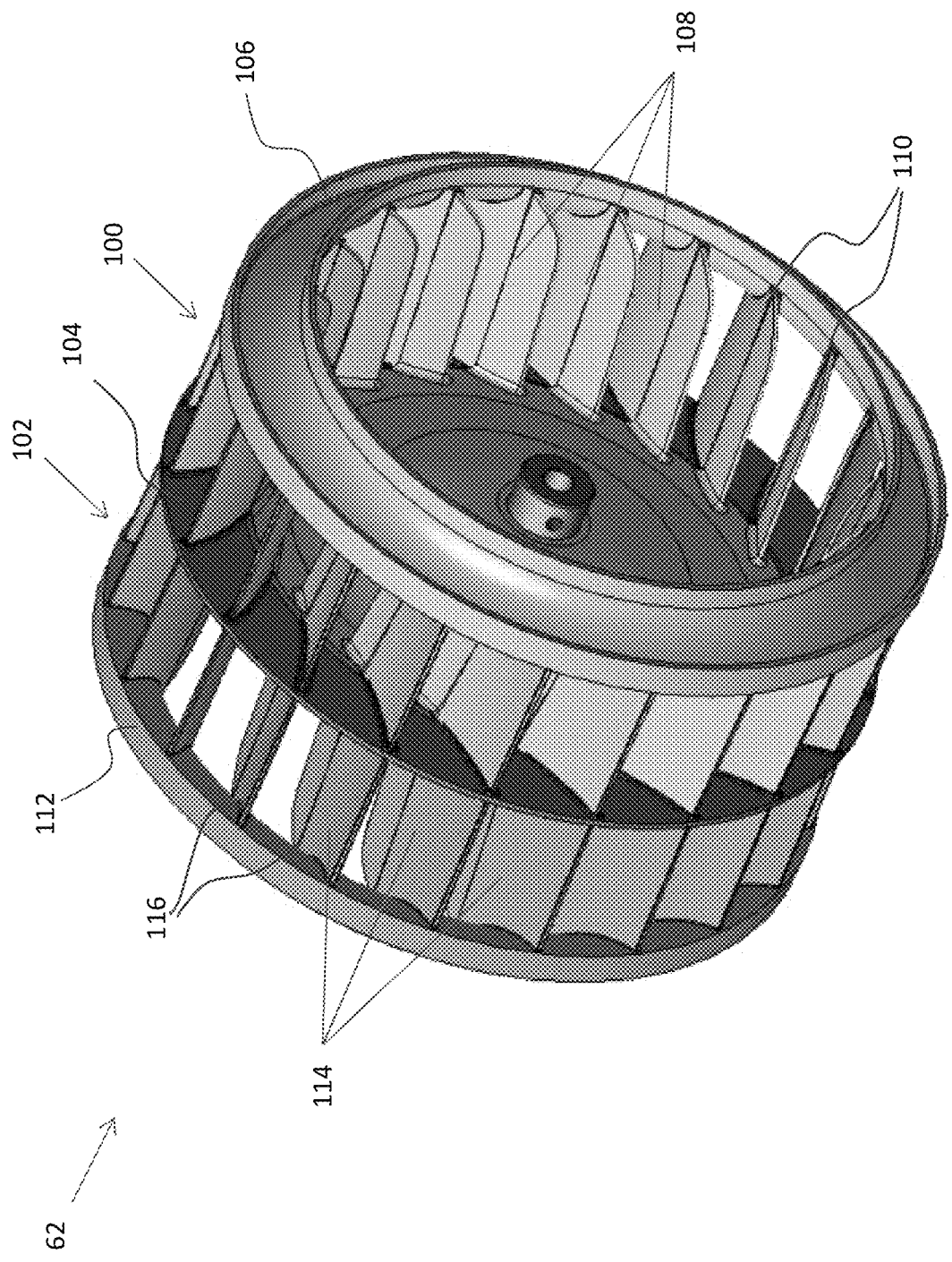
FIG. 3 is a perspective view of a fan wheel of the blower assembly according to an embodiment.
Figure 4:
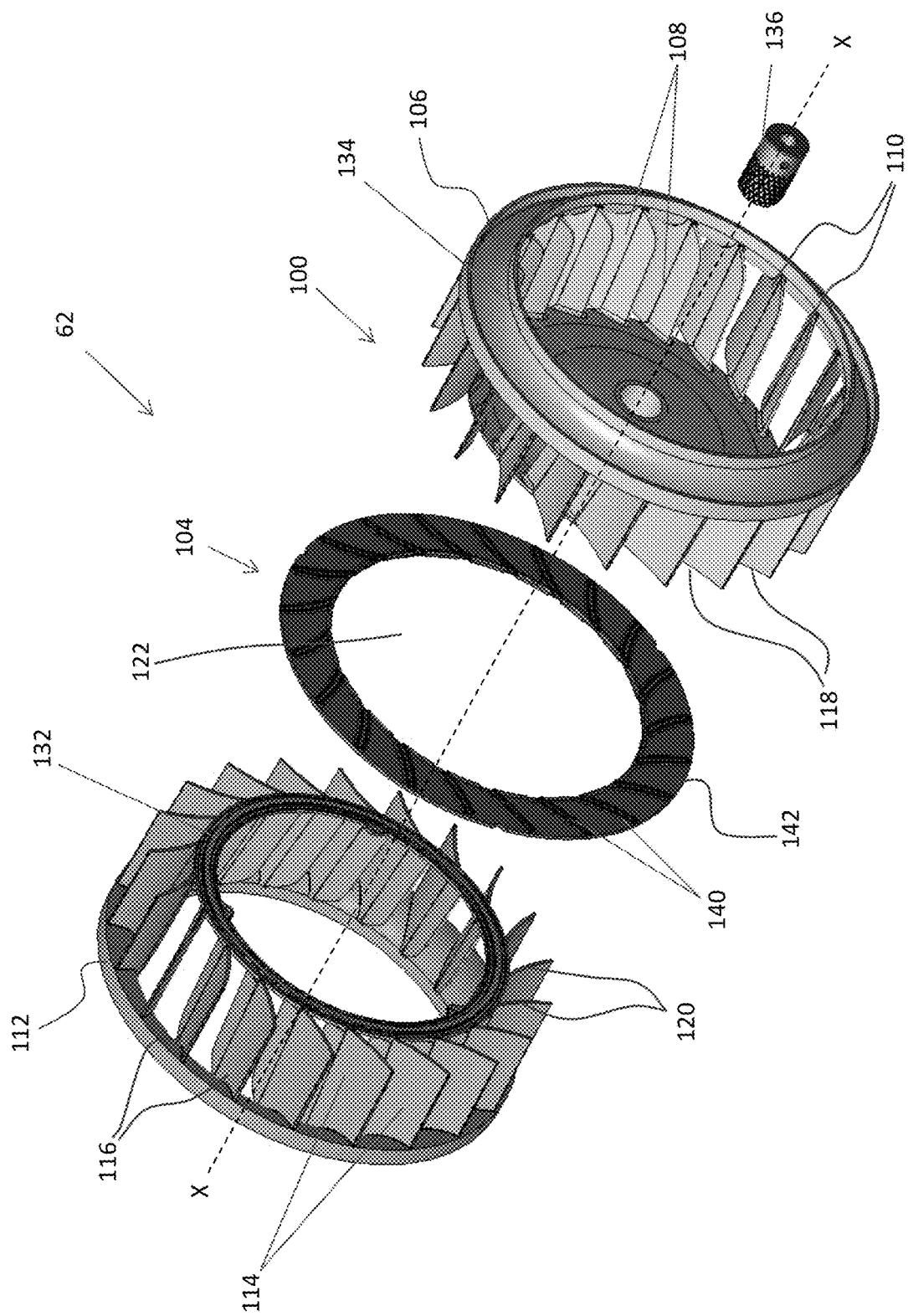
FIG. 4 is an exploded perspective view of a fan wheel of FIG. 3 according to an embodiment.
Figure 5:
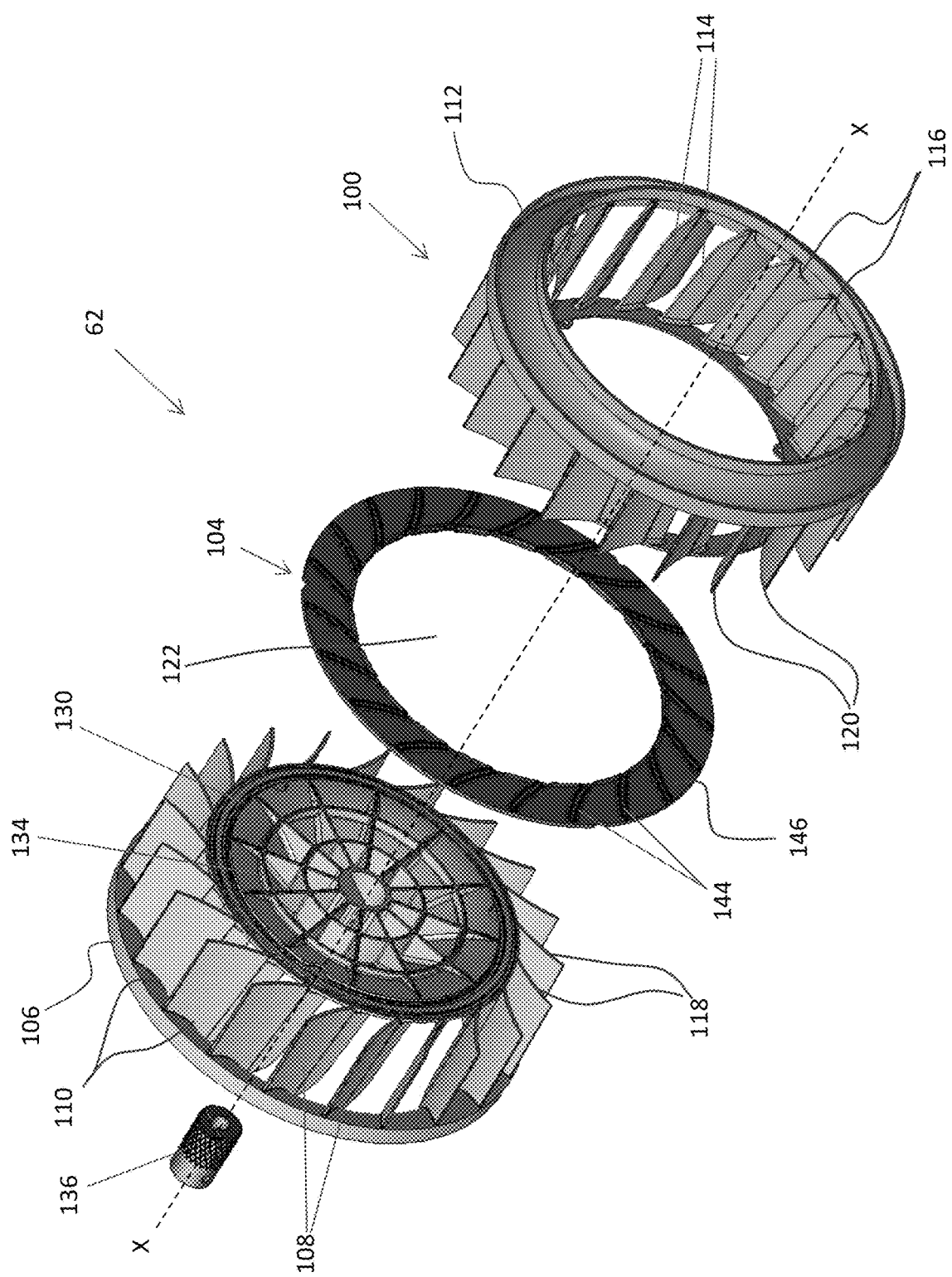
FIG. 5 is another exploded perspective view of a fan wheel of FIG. 3 according to an embodiment.

With reference now to FIG. 2, the blower assembly 52 is illustrated in more detail. Although the blower assembly 52 is illustrated and described herein with reference to a furnace, it should be understood that the blower assembly 52 may be used in other suitable applications, such as in an air handling unit of an HVAC and/or refrigeration system for example. The blower assembly 52 includes a fan wheel 62 positioned within a blower housing 64. The blower housing 64 has an outer wall 66 having a scroll-shaped length that extends from a first end edge 68 to an opposite second end edge 70. The first end edge 68 the second end edge 70 define opposite sides of an outlet opening 72 of the blower housing 64. Although the outlet opening 72 is illustrated as being generally rectangular in shape, embodiments where the outlet opening 72 is another shape are also contemplated herein. The blower housing 64 additionally includes a first sidewall 74 and a second sidewall 76. As seen in the FIG., portions of the peripheries of the first sidewall 74 and the second sidewall 76 are connected to opposite sides of the outer wall 66. The first sidewall 74 has a first straight edge portion 78 extending between the outer wall first end edge 68 and the outer wall second end edge 70 and the second sidewall 76 similarly has a second straight edge portion 80 extending between the outer wall first end edge 68 and the outer wall second end edge 70. The first sidewall 74 includes a first aperture 82 and the second sidewall includes a second aperture (not shown).

With reference now to FIGS. 3-10, the fan wheel 62 is illustrated in more detail. The fan wheel 62 is typically formed as an assembly of three primary components: a first wheel portion 100, a second wheel portion 102, and a support ring 104 located centrally between the first wheel portion 100 and the second wheel portion 102. When the fan wheel 62 is incorporated into a blower assembly 52 of a furnace system, such as system 20 of FIG. 1, both the first wheel portion 100 and the second wheel portion 102 are configured to provide air to an adjacent component and are associated with a single plenum. The first wheel portion 100 includes a shroud 106 and a first plurality of impeller blades 108 spaced about a periphery of the shroud 106 and connected thereto at a first end 110. The second wheel portion 96 similarly includes a shroud 112 and a second plurality of impeller blades 114 arranged about a periphery of the shroud 112 and connected thereto at a first end 116. In an embodiment, one or both of the first plurality and the second plurality of impeller blades 108, 114 are configured as backward curved impeller blades. However, embodiments where one or both of the first plurality and second plurality of impeller blades 108, 114 have a forward curved configuration, or another configuration are also contemplated herein.

In an embodiment, the first wheel portion 100 is dissimilar from the second wheel portion 102 such that the fan wheel 62 has an asymmetrical configuration about a plane oriented parallel to an intersecting the support ring 104. Examples of a fan blower 62 having an asymmetrical configuration are disclosed in U.S. Provisional Application Ser. No. 62/409,669 filed on Oct. 18, 2016, the entire contents of which are incorporated herein by reference. Alternatively, embodiments where the first wheel portion 100 and the second wheel portion 102 have a symmetric configuration are also considered within the scope of the disclosure.

The support ring 104 is configured to connect to the second end 118, 120 of both the first plurality of impeller blades 108 and the second plurality of impeller blades 114, respectively. Accordingly, the support ring 104 forms a barrier separating the blades 108, 114 of the first wheel portion 100 and a second wheel portion 102. As a result, the first plurality of impeller blades 108 is axially spaced from the second plurality of impeller blades 114. The support ring 104 has a generally planar configuration. In an embodiment, the support ring 104 has a central opening 122 and an inner diameter of the central opening 122 is slightly greater than or equal to the inner diameter defined by an inner edge 124, 126 of at least one of the first plurality and the second plurality of impeller blades 108, 114, respectively. Similarly, an outer diameter of the support ring 104 is generally equal to the outer diameter of the fan wheel 62 which may be defined by an outer edge 128, 129 of at least one of the first plurality and the second plurality of impeller blades 108, 114.

Figure 6:
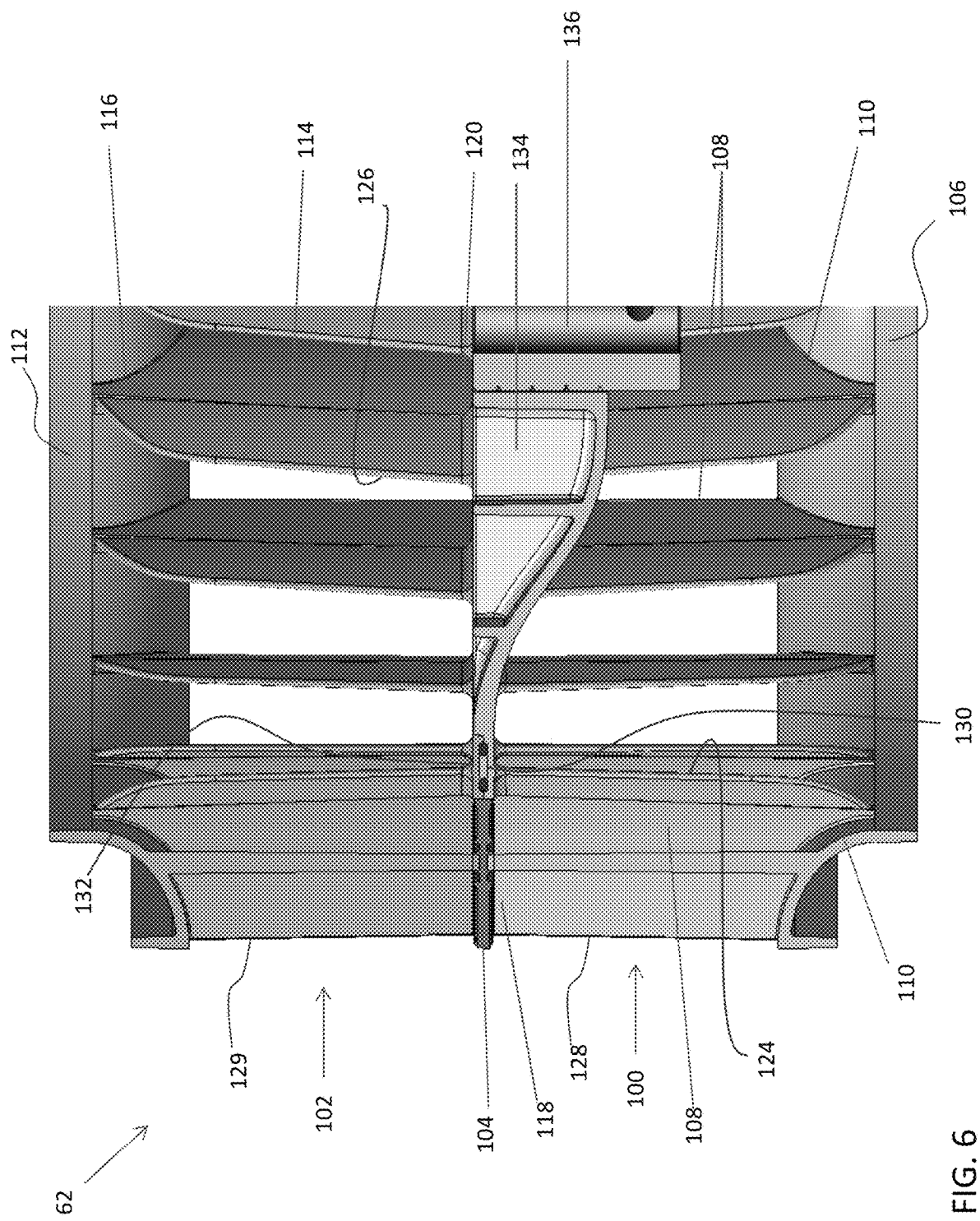
FIG. 6 is a side view of a fan wheel of FIG. 3 according to an embodiment.
Figure 7:
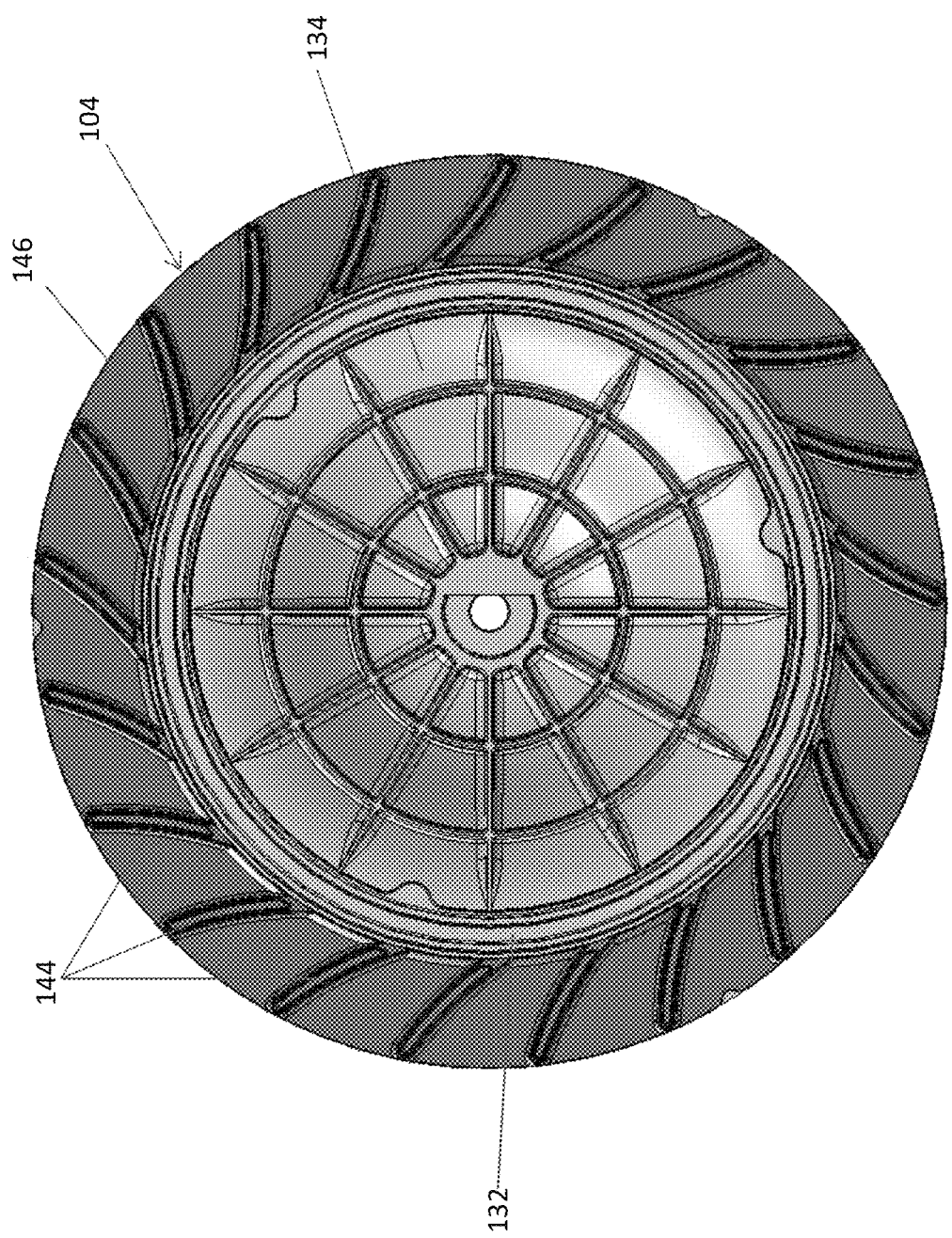
FIG. 7 is an end view of a portion of the fan wheel of FIG. 3 according to an embodiment.

A circular connector 130, 132 (see FIGS. 4 and 5) couples the inner edge 124, 126 of the second end 118, 120 of each the first plurality of impeller blades 108 and the second plurality of impeller blades 114, respectively. In the illustrated, non-limiting embodiment, a central hub 134 for mounting the fan wheel 62 to a drive shaft 136 for rotation about an axis X is coupled to the connector 130 of the first wheel portion 110. As best shown in FIG. 6, the central hub 134 and the connector 130 may be integrally formed, or alternatively, may be connected, such as via fasteners or another suitable connection mechanism. Because the central hub 134 is associated with the connector 130, a diameter of the central hub 134 is generally complementary to or receivable within the hollow interior of the support ring. Although the first wheel portion 100 is illustrated as incorporating the central hub 134, embodiments where the second wheel portion 102 alternatively includes the hub 134 are also within the scope of the disclosure.

One or more of the first wheel portion 100, second wheel portion 102, and support ring 104, is formed from a polymer or plastic material having a suitable fire rating. Examples of suitable materials include, but are not limited to a glass fiber reinforced, flame retardant, Polyamide 6, such as Schulamid® 6 GBF 3015 FR 4 for example, Polyamide 66, such as Ultramid® 66 H2 G/35-V0KB1 BK3324 for example, and a Nylon 6/6, such as RTP 299 X 141130 B for example. In an embodiment, the material selected for at least one of the first wheel portion 100, second wheel portion 102, and support ring 104 will satisfy the testing standards of the UL certification UL94 V-0, 5VA. The materials of the first wheel portion 100, second wheel portion 102, and support ring 104, may be the same, or alternatively, may be different. Further, in an embodiment, the support ring 104 may be formed from a material having a reduced amount of glass fiber compared to at least one of the first wheel portion 100 second wheel portion 102.

The support ring 104 includes a plurality of blade receiving areas spaced about the periphery thereof. As shown, a first plurality of blade receiving areas 140 formed in a first surface 142 of the support ring are adapted to receive the second ends 118 of the first plurality of impeller blades 108, respectively. Similarly, a second plurality of blade receiving areas 144 formed in a second, opposite surface 146 of the support ring 104 are adapted to receive the second ends 120 of the second plurality of impeller blades 114, respectively. As shown, the first plurality of blade receiving areas 140 is substantially aligned with the second plurality of blade receiving areas 144 (see FIGS. 8 and 10). However, embodiments, where the first plurality of blade receiving areas 140 are offset from the second plurality of blade receiving areas 144, as shown in FIG. 11, are also contemplated herein.

Figure 8:
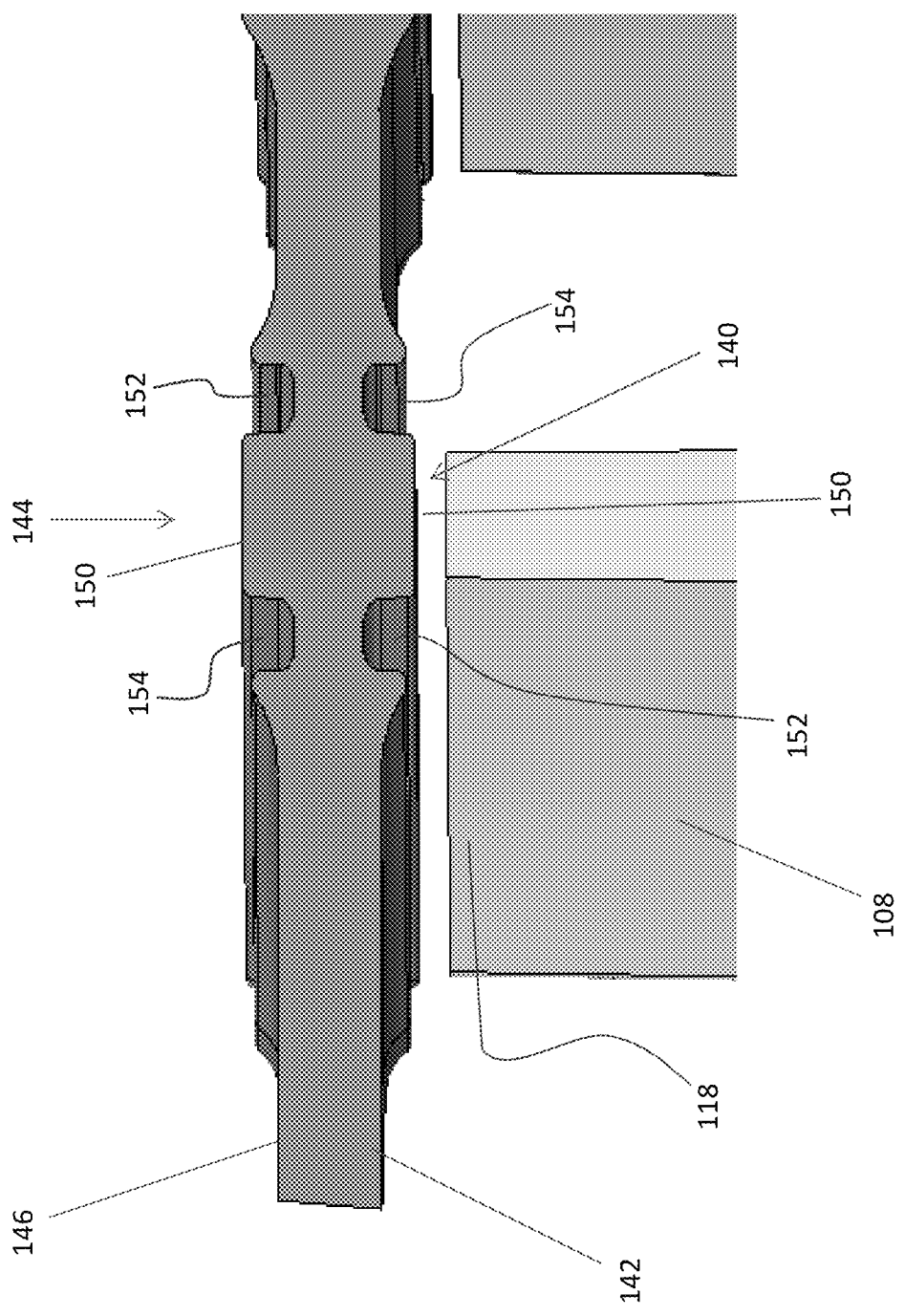
FIG. 8 is a cross-sectional view of a portion of the fan wheel of FIG. 3 according to an embodiment.
Figure 9:
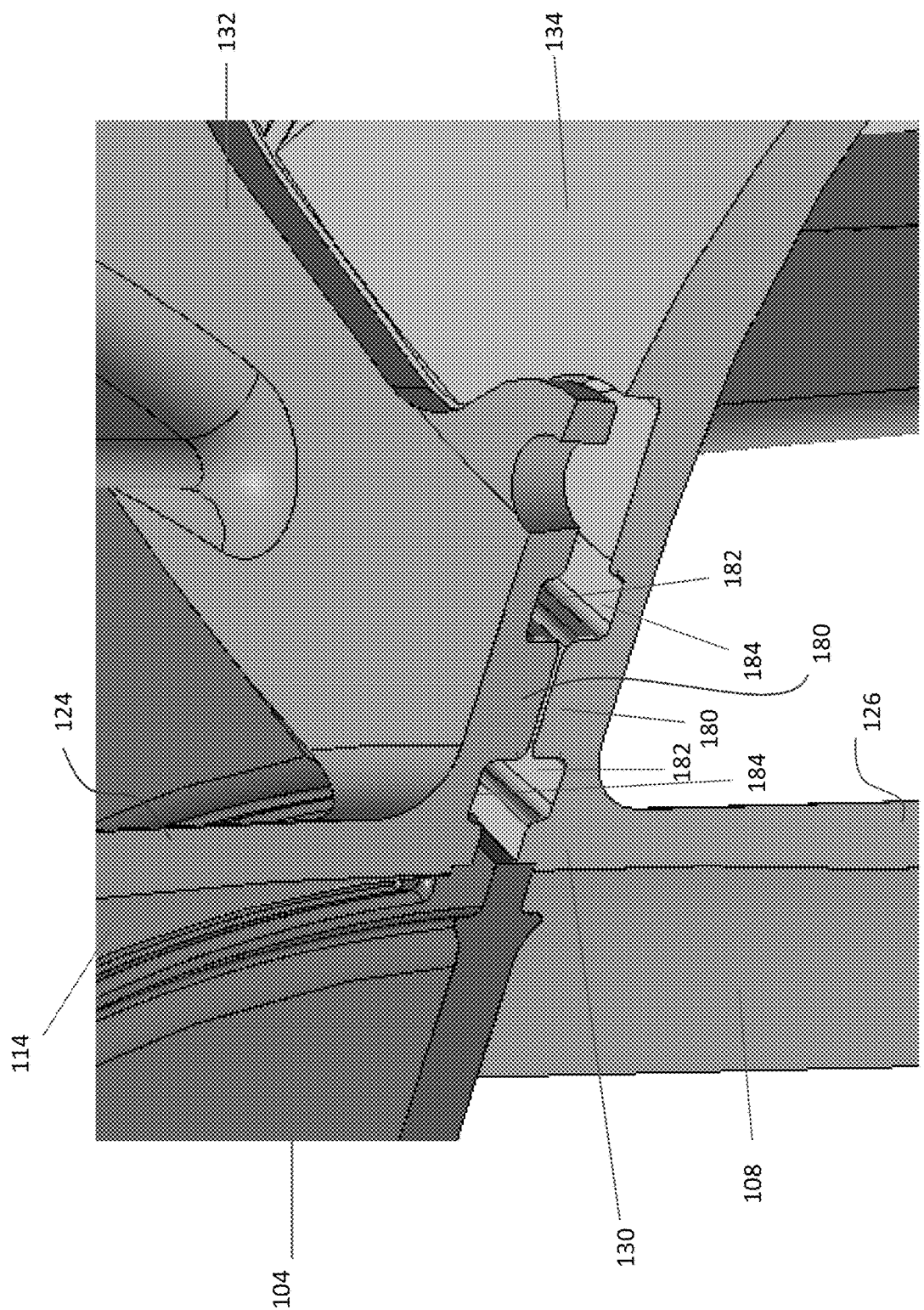
FIG. 9 is a perspective view of a portion of the fan wheel of FIG. 3 according to an embodiment.
Figure 10:
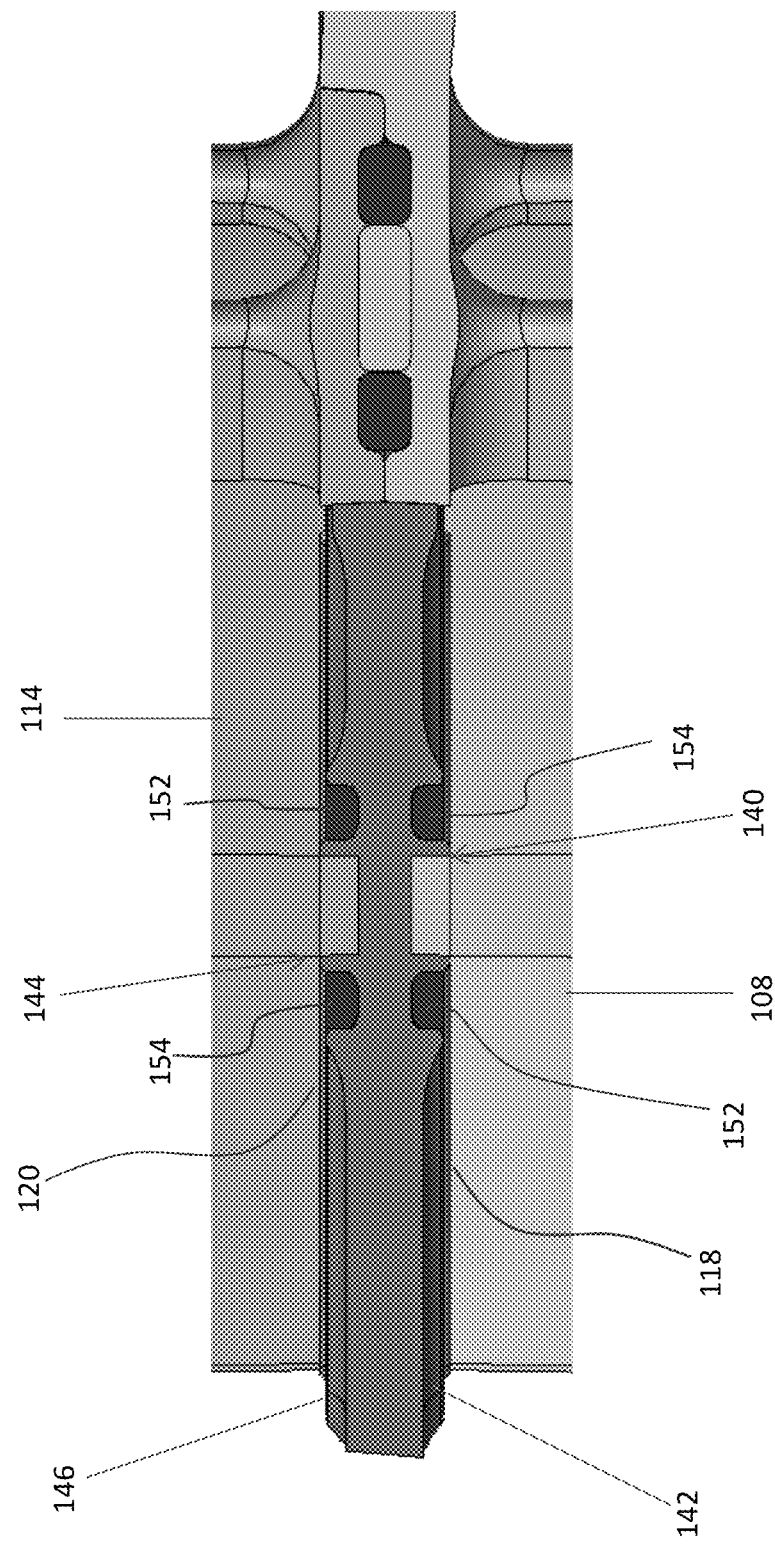
FIG. 10 is a cross-sectional view of a portion of the fan wheel of FIG. 3 after a welding operation according to an embodiment.

In an embodiment, best shown in FIGS. 8-10, each of the blade receiving areas 140, 144 includes a land 150 defined by a first groove 152 located adjacent a first side of the land 150, and a second groove 154 positioned adjacent a second side of the land. A second end 118, 120 of a corresponding impeller blade 108, 114 is positioned in direct contact with the surface of the land 150. The second end 118, 120 of the corresponding impeller blade 108, 114 and the land 150 are attached, such as via a welding operation for example, to integrally form the end 118, 120 of the impeller blade 108, 114 with the support ring 104. When the land 150 and/or the blades 108, 114 are heated, a force is applied to the blade 108, 114 such that the end 118, 120 of the blade 108, 114 displaces all or a portion of the material of the land 150. As a result, during the process of attaching of the blades 108, 114 to the support ring 104, one or both of the first and second grooves 152, 154 positioned adjacent each land 150 may fill at least partially with overflow material generated by affixing the blade end 118, 120 to the land 150 of the support ring 104.

Figure 11:
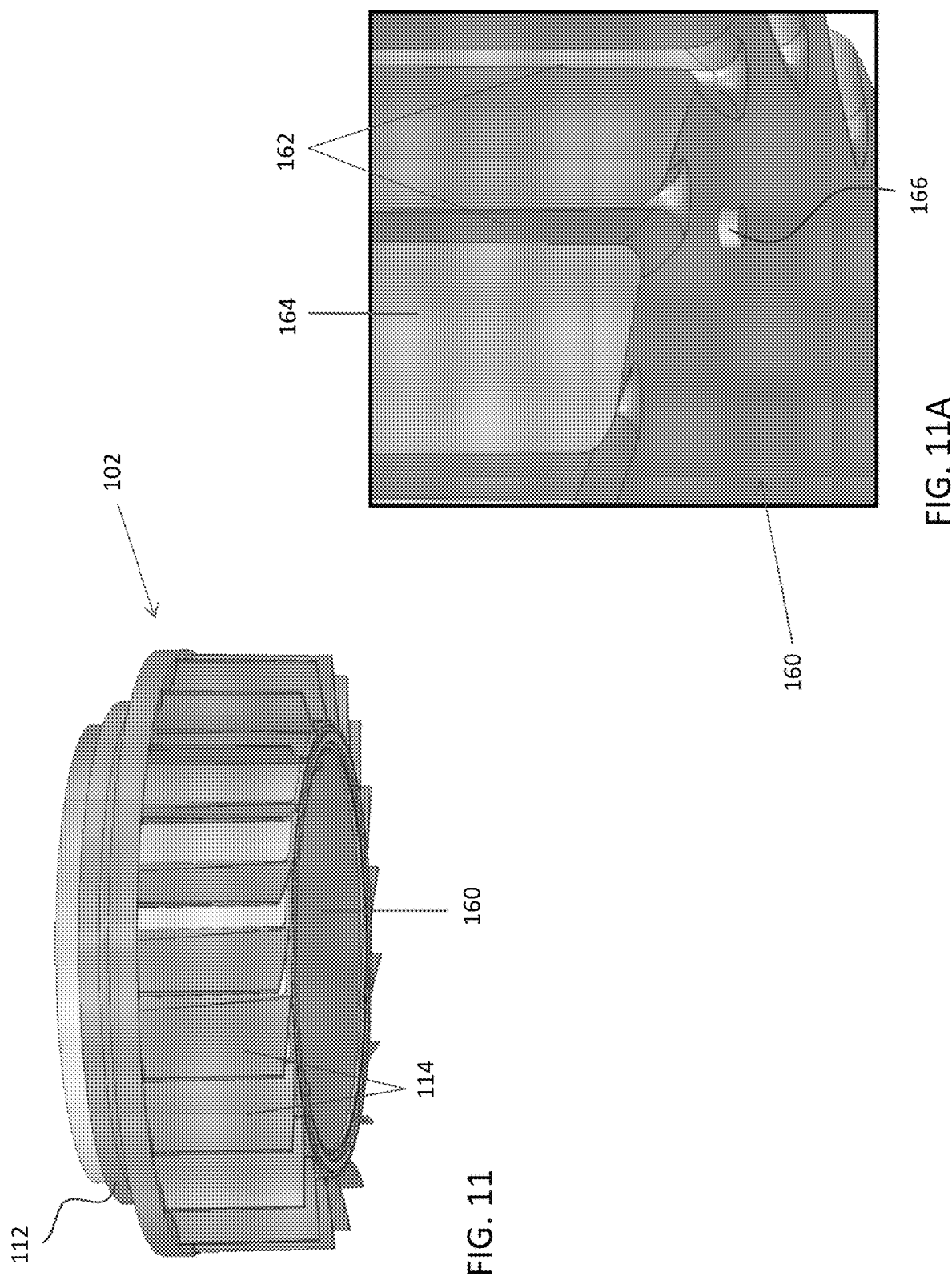
FIG. 11 is a perspective view of a portion of the fan wheel and a nesting fixture according to an embodiment.

During a welding operation, a nesting fixture 160, best shown in FIGS. 11 and 11A, is received within the hollow interior of the first wheel portion 100 and/or the second wheel portion 102. One or more grooves 162 may be formed in the outer periphery 164 of the nesting fixture 160. The grooves 162 are sized to receive the inner end 124, 126 of the plurality of impeller blades 108, 114 of a corresponding wheel portion 100, 102. The nesting fixture 160 maintains an orientation of the blades 108, 114 as heat is applied thereto and the blades 108, 114 are forced into contact with blade receiving areas 140, 144 of the support ring 104. In an embodiment, the nesting fixture 160 includes one or more indexing features 166 that align with a corresponding notch or cavity formed in the support ring 104. Inclusion of these indexing features 166 ensures that the nesting fixture 160 is always arranged in the same orientation relative to the support ring 104 during a welding operation.

Figure 12:
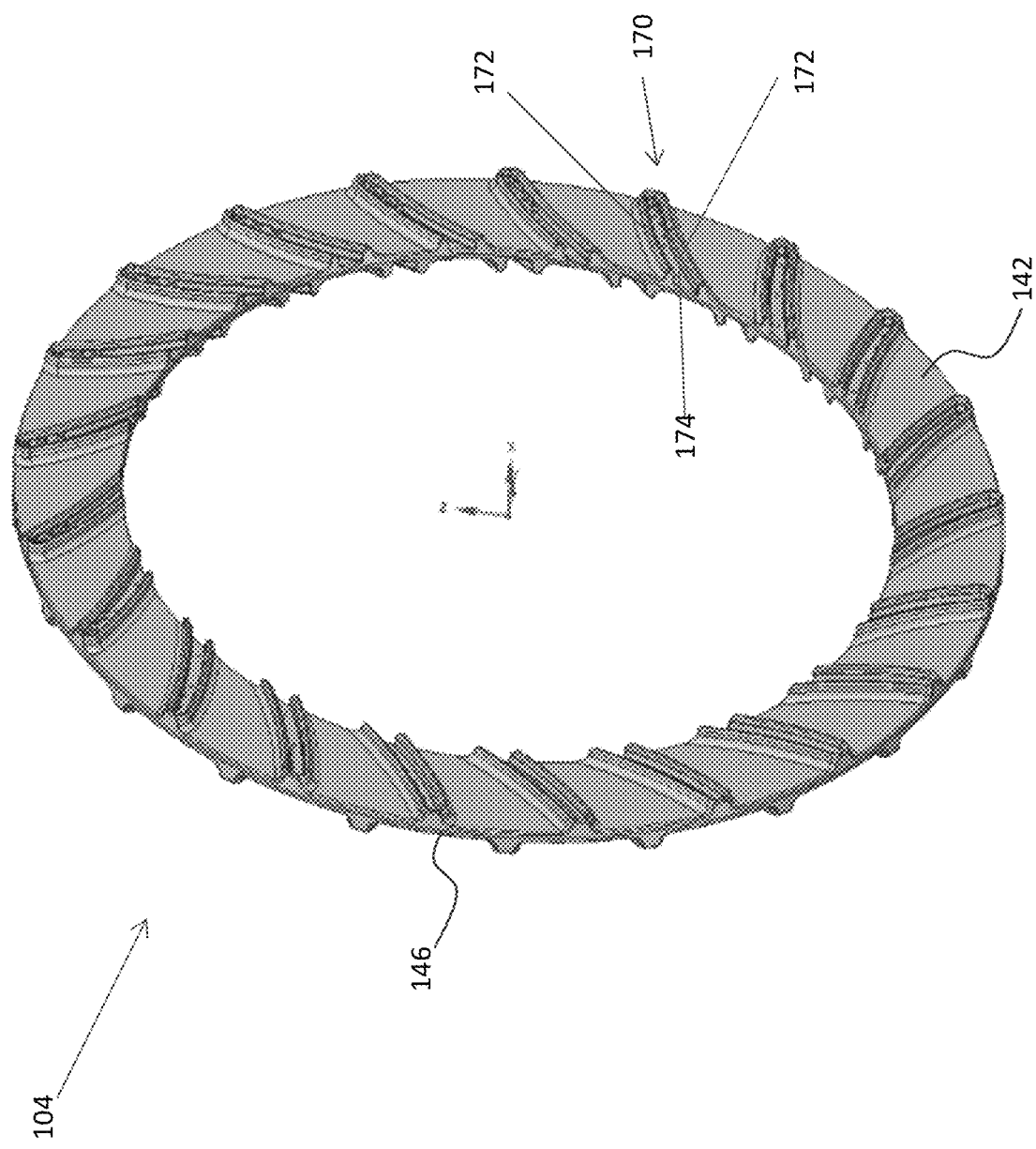
FIG. 12 is a perspective view of a support ring of the fan wheel according to an embodiment.
Figure 13:
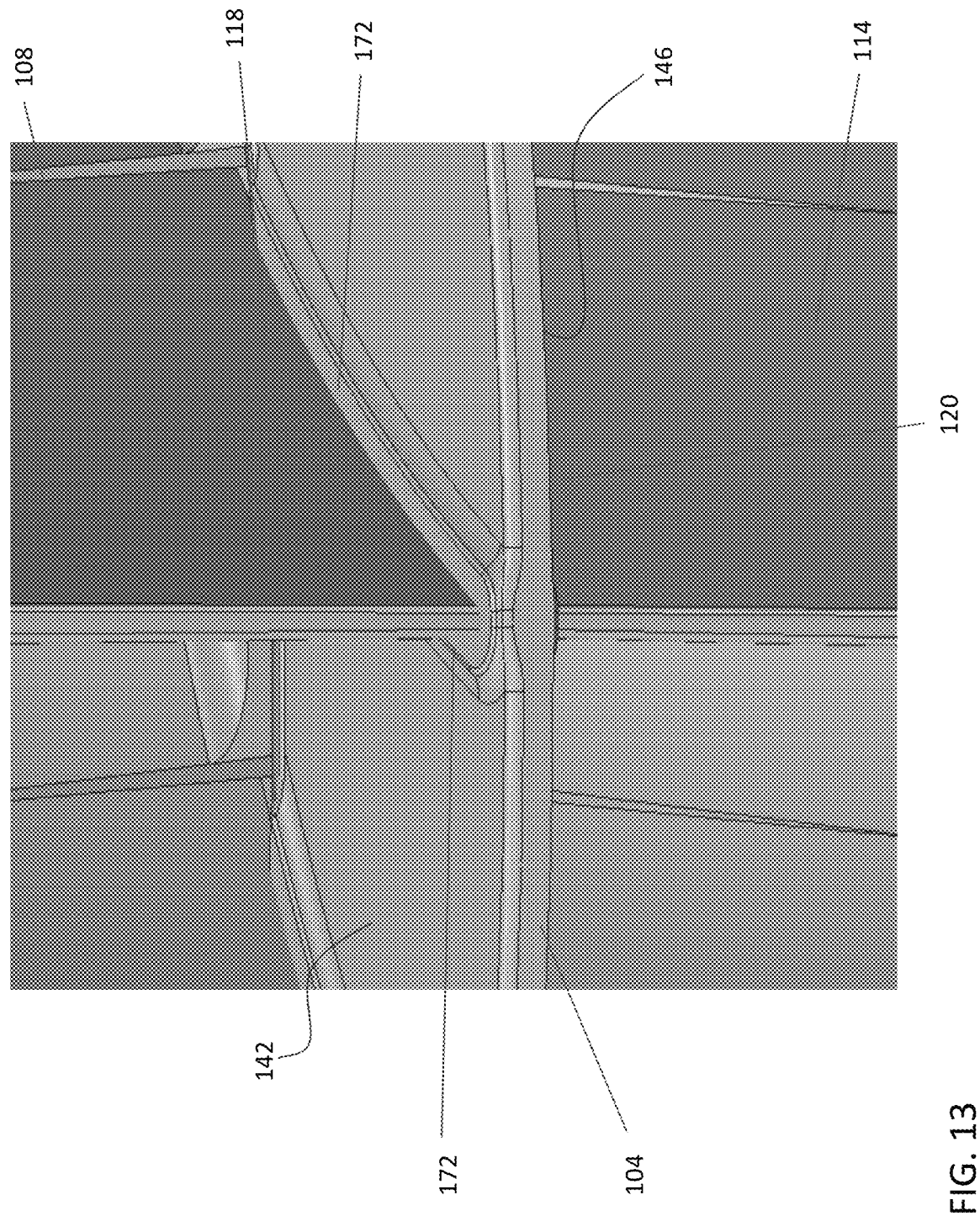
FIG. 13 is a perspective view of a fan assembly including the support ring of FIG. 12 according to an embodiment.

With reference now to FIGS. 12 and 13, in another embodiment, the blade receiving areas 140, 144 include pockets 170 formed in the first and/or second surface 142, 146 of the support ring 104. The pockets 170 may be formed by one or more sidewalls 172 that extend from a surface 142, 146 of the support ring 104 and that define an opening 174 there between. The opening 174 is generally complementary, i.e. has a similar size and shape to the second end 118, 120 of the impeller blade 108, 114 being received therein. In embodiments where the blade receiving areas 140, 144 include such pockets 170, the blades 108, 114 are coupled to the support ring 104 mechanically, and no further attachment process, such as a welding operation for example, is required to couple the wheel portions 100, 102 to the support ring 104.

When the first wheel portion 100 and the second wheel portion 102 are attached to the support ring 104, the circular connector 130, 132 of both the first and second wheel portions 100, 102 directly about one another, as best shown in FIG. 9. During the assembly of the first and second wheel portions 100, 102 to the support ring 104, the circular connectors 130, 132 may similarly be coupled to one another. In an embodiment, a welding operation is used to attach the circular connectors 130, 132. Heat may be applied at the interface between the circular connectors 130, 132, each of which similarly includes a raised surface 180 and a first and second groove 182, 184 disposed on opposing sides of the raised surface 180. With the applied heat, the raised surfaces 180 in melt together to integrally form the circular connectors 130, 132. The melted material may additionally flow from the raised surfaces 180 into one or both of the first and second grooves 182, 184. In an embodiment, a welding operation, such as the application of heat for example, may be used to couple the circular connectors 130, 132, regardless of whether the wheel portions 100, 102 are welded, mechanically connected using fasteners or molded in snap features, or over-molded to the support ring 104.

The fan wheel 62 as illustrated and described herein has an improved efficiency compared to conventional fan wheels 62. As a result, a motor having a decreased horsepower can be used to satisfy regulatory furnace efficiency requirements. Further, the use of plastic molding and the manufacturing processes associated therewith result in reduced clearances and refined blade aerodynamic profiles which may increase the aerodynamic performance of the fan wheel.

The blower assembly 52 illustrated and described herein has an improved efficiency compared to conventional blower assemblies. In addition, the blower assembly 52 may be adapted for use in the blower portion 34 of existing furnaces 20 without requiring modification of the cabinet or housing.

Embodiment 1: A method of assembling a fan wheel comprising: forming a first wheel portion including a first plurality of impeller blades and a first connector; forming a second wheel portion including a second plurality of impeller blades and a second connector; affixing an end of each of the first plurality of impeller blades to a first surface of a support ring such that the first connector is affixed to the second connector; and affixing an end of each of the second plurality of impeller blades to a second surface of a support ring.

Embodiment 2: The method of embodiment 1, wherein the first wheel portion is formed separately from the second wheel portion.

Embodiment 3: The method of embodiment 1, wherein affixing the end of the first plurality of impeller blades to the first surface of a support ring includes positioning the ends of the first plurality of impeller blades at a plurality of blade receiving areas of the first surface of the support ring.

Embodiment 4: The method of embodiment 3, wherein positioning the ends of the first plurality of impeller blades at a plurality of blade receiving areas of the first surface includes positioning the ends of the first plurality of impeller blades within a plurality of pockets formed in the first surface of the support ring.

Embodiment 5: The method of embodiment 4, wherein each of the pockets further comprises a first sidewall, a second sidewall, and an opening defined between the first sidewall and the second sidewall, and positioning the ends of the first plurality of impeller blades within the plurality of pockets further comprises installing the ends of the first plurality of impeller blades within the openings of the plurality of pockets.

Embodiment 6: The method of embodiment 3, wherein each of the plurality of blade receiving areas includes a land and at least one groove adjacent the land, and positioning the ends of the first plurality of impeller blades at a plurality of blade receiving areas of the first surface includes further comprises positioning the ends of the first plurality of impeller blades in direct contact with the plurality of lands.

Embodiment 7: The method of embodiment 6, wherein affixing an end of each of the first plurality of impeller blades to a first surface of a support ring further comprises welding the ends to the plurality of blade receiving areas of the first surface of the support ring.

Embodiment 8: The method of embodiment 7, wherein welding the ends to the plurality of blade receiving areas of the first surface of the support ring further comprises welding the ends of the first plurality of impeller blades to the plurality of lands.

Embodiment 9: The method of embodiment 8, wherein welding the ends of the first plurality of impeller blades to the plurality of lands displaces a portion of material of the lands into the at least one groove.

Embodiment 10: The method of embodiment 1, wherein coupling the first connector and the second connector includes welding the first connector to the second connector.

Embodiment 11: The method of embodiment 1, wherein at least one of the first wheel portion and the second wheel portion is formed via a plastic molding process.

Embodiment 12: A fan wheel for use in a blower assembly, comprising: a first wheel portion including a first plurality of impeller blades; a second wheel portion including a second plurality of impeller blades; a support disk positioned near a center of the fan wheel, between the first wheel portion and the second wheel portion, wherein the support disk couples the first wheel portion to the second wheel portion and at least one of the first wheel portion, the second wheel portion, and the support disk is formed from a plastic material.

Embodiment 13: The fan wheel of embodiment 12, wherein the first wheel portion, the second wheel portion, and the support ring are formed separately.

Embodiment 14: The fan wheel of embodiment 12, wherein the fan wheel includes a first plurality of blade receiving areas formed in a first surface and the fan wheel includes a second plurality of blade receiving areas formed in a second, opposite surface.

Embodiment 15: The fan wheel of embodiment 14, wherein the first plurality of impeller blades are welded to the first plurality of blade receiving areas.

Embodiment 16: The fan wheel of embodiment 14, wherein the first plurality of impeller blades are mechanically coupled to the first plurality of blade receiving areas.

Embodiment 17: The fan wheel of embodiment 16, wherein the first plurality of blade receiving areas include a plurality of pockets including openings complementary to the first plurality of impeller blades.

Embodiment 18: The fan wheel of embodiment 14, wherein the first wheel portion further comprises a first connector and the second wheel portion further comprises a second connector and the first connector is coupled to the second connector.

Embodiment 19: The fan wheel of embodiment 14, wherein the first connector is welded to the second connector.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A fan wheel for use in a blower assembly, comprising:
   a first wheel portion including a first plurality of impeller blades;
   a second wheel portion including a second plurality of impeller blades;
   a support disk positioned near a center of the fan wheel, between the first wheel portion and the second wheel portion, wherein the support disk couples the first wheel portion to the second wheel portion and at least one of the first wheel portion, the second wheel portion, and the support disk is formed from a plastic material, wherein a first surface of the support disk includes a first plurality of blade receiving areas, each of the first plurality of blade receiving areas including a planar land defined between a first groove and a second groove.

2. The fan wheel of claim 1, wherein the first wheel portion, the second wheel portion, and the support ring are formed separately.

3. The fan wheel of claim 1, wherein the support disk includes a second plurality of blade receiving areas formed in a second, opposite surface.

4. The fan wheel of claim 3, wherein the first plurality of impeller blades are welded to the first plurality of blade receiving areas.

5. The fan wheel of claim 3, wherein the first plurality of impeller blades are mechanically coupled to the first plurality of blade receiving areas.

6. The fan wheel of claim 3, wherein the first wheel portion further comprises a first connector and the second wheel portion further comprises a second connector and the first connector is coupled to the second connector.

7. The fan wheel of claim 6, wherein the first connector is welded to the second connector.

* * * * *